US012809222B2

(12) United States Patent
Lee et al.

(10) Patent No.: US 12,809,222 B2
(45) Date of Patent: Nov. 24, 2026

(54) PROGRAMMABLE DIELECTROPHORETIC SEMICONDUCTOR CHIP, PACKAGING STRUCTURE AND CONTROL SYSTEM THEREOF

(71) Applicant: National Yang Ming Chiao Tung University, Hsinchu City (TW)

(72) Inventors: Chen-Yi Lee, Hsinchu City (TW); Wen-Yue Lin, Hsinchu City (TW); Lin-Hung Lai, Hsinchu City (TW)

(73) Assignee: National Yang Ming Chiao Tung University, Hsinchu City (TW)

( * ) Notice: Subject to any disclaimer, the term of this patent is extended or adjusted under 35 U.S.C. 154(b) by 272 days.

(21) Appl. No.: 18/762,720

(22) Filed: Jul. 3, 2024

(65) Prior Publication Data

US 2026/0010047 A1 Jan. 8, 2026

(51) Int. Cl.

*G02F 1/167* (2019.01)
*G02F 1/16753* (2019.01)
*G02F 1/16755* (2019.01)
*G02F 1/16756* (2019.01)
*G02F 1/1676* (2019.01)
*G02F 1/1685* (2019.01)

(52) U.S. Cl.

CPC .......... *G02F 1/167* (2013.01); *G02F 1/16753* (2019.01); *G02F 1/16755* (2019.01); *G02F 1/16756* (2019.01); *G02F 1/1676* (2019.01); *G02F 1/1685* (2019.01); *G02F 2202/42* (2013.01)

(58) Field of Classification Search

CPC .. G02F 1/167; G02F 1/16753; G02F 1/16755; G02F 1/16756; G02F 1/1676; G02F 1/1685; G02F 2202/42

See application file for complete search history.

(56) References Cited

U.S. PATENT DOCUMENTS

2006/0063183 A1* 3/2006 Segawa .................. B03C 5/026 435/287.2
2025/0154448 A1* 5/2025 Zimmermann ........ C12M 35/02

OTHER PUBLICATIONS

Huang et al. Dielectrophoretic Cell Separation and Gene Expression Profiling on Microelectronic Chip Arrays. Anal. Chem. 2002, 74, 3362-3371 (Year: 2002).*

(Continued)

*Primary Examiner* — Collin X Beatty
(74) *Attorney, Agent, or Firm* — Amin, Turocy & Watson, LLP

(57) ABSTRACT

The present inventive concept discloses a programmable dielectrophoretic semiconductor chip, which comprises a microelectrode. The microelectrode comprises: a surface; a top electrode provided close to the surface; a first logic circuit used to receive and store a pattern signal; and a second logic circuit is used to receive a first analog signal and a second analog signal which are input from an external part of the microelectrode, wherein the second logic circuit is used to choose the first analog signal or the second analog signal according to the pattern signal which is received by the first logic circuit, and a voltage of the top electrode changes with the first analog signal or the second analog signal. The semiconductor chip of the present inventive concept is capable to move or position a specific single particle. In addition, the present inventive concept further provides a packaging structure with semiconductor chip and a control system of the semiconductor chip.

19 Claims, 5 Drawing Sheets

(56) References Cited

OTHER PUBLICATIONS

Cheng et al. Preparation and hybridization analysis of DNA/RNA from *E. coli* on microfabricated bioelectronic chips. Nature Biotechnology vol. 16 Jun. 1998. (Year: 1998).*
Gascoyne et al. Dielectrophoresis-Based Sample Handling in General-Purpose Programmable Diagnostic Instruments. Proceedings of the IEEE, vol. 92, No. 1, Jan. 2004 (Year: 2004).*
Hewlett Packard. HP 33120A Function/Arbitrary Waveform Generator. 1998 (Year: 1998).*
ISCAS 2024, Program at a Glance, Published May 22, 2024.
Lin, et al. "A Programmable CMOS Dielectrophoresis Array Chip with 128×128 Electrodes for Cell Manipulation", Published May 22, 2024.
ISCAS 2024, IEEE International Symposium on Circuits and Systems, Final Program, Published May 22, 2024.

* cited by examiner

PROGRAMMABLE DIELECTROPHORETIC SEMICONDUCTOR CHIP, PACKAGING STRUCTURE AND CONTROL SYSTEM THEREOF

BACKGROUND OF THE INVENTION

1. Field of the Invention

The present disclosure generally relates to a programmable semiconductor chip, particularly, to a semiconductor chip for biotechnology applications.

2. Description of the Related Art

Related technologies for manipulating microscale particles, such as cells and other biological samples, are developing continuously and they are driven by the increasing demand for high-throughput and high-precision. These technologies could be applied to cell sorting, drug delivery and various fields of research in biology.

CMOS (Complementary Metal Oxide Semiconductor) capacitive sensing chips with high sensitivity and resolution are capable to detect the quality of microparticle. According to the sorting criteria, the desired and undesired particles are identified by the chips.

Dielectrophoresis (DEP) is a technique which uses non-uniform electric fields to exert forces on particles. It facilitates the manipulation, separation and positioning of the particles. However, the practical application of DEP technique is often hindered by the absence of suitable platforms capable of generating complex and programmable electric field patterns.

Therefore, how to provide a semiconductor chip capable to identify desired particles precisely and to move and separate the particles without the need for labeling has become an urgent problem to be solved in the industry.

SUMMARY OF THE INVENTION

The purpose of the present invention is to provide a semiconductor chip capable to sense and manipulate the movement of particles, a packaging structure and a control system thereof.

In light of solving the foregoing problems of the prior art, in a first aspect, the present inventive concept provides a programmable dielectrophoretic semiconductor chip. The semiconductor chip comprises a microelectrode, wherein the microelectrode comprises: a surface; a top electrode provided close to the surface; a first logic circuit used to receive and store a pattern signal; and a second logic circuit connected electrically to the top electrode and the first logic circuit, and the second logic circuit is used to receive a first analog signal and a second analog signal which are input from an external part of the microelectrode, wherein the second logic circuit is used to choose the first analog signal or the second analog signal according to the pattern signal which is received by the first logic circuit, and a voltage of the top electrode changes with the first analog signal or the second analog signal.

According to an embodiment of the present inventive concept, the microelectrode further comprises a sensing component, wherein the sensing component is used to sense an information for a particle on the surface corresponding to the microelectrode.

According to an embodiment of the present inventive concept, the microelectrode further comprises an insulating layer, wherein the insulating layer is provided between the top electrode and the surface.

According to an embodiment of the present inventive concept, the microelectrode further comprises an insulating layer, wherein part of the insulating layer is provided between the top electrode and the surface.

According to an embodiment of the present inventive concept, the microelectrode has a plurality of metal layers.

According to an embodiment of the present inventive concept, the top electrode is the one with the shortest distance from the surface among the plurality of metal layers.

According to an embodiment of the present inventive concept, the top electrode is the second highest metal layer among the plurality of metal layers which are manufactured.

According to an embodiment of the present inventive concept, the semiconductor chip comprises a plurality of microelectrodes, wherein the plurality of microelectrodes are serial-connected to form a scan chain.

According to an embodiment of the present inventive concept, the semiconductor chip comprises a plurality of scan chains, wherein each scan chain comprises the plurality of microelectrodes.

According to an embodiment of the present inventive concept, the first logic circuit of one of the plurality of microelectrodes is used to receive and store the pattern signal which is output from the first logic circuit of another microelectrode connected in series to the microelectrode.

According to an embodiment of the present inventive concept, the first analog signal is different from the second analog signal.

In a second aspect, the present inventive concept provides a packaging structure with the programmable dielectrophoretic semiconductor chip. The packaging structure comprises a programmable dielectrophoretic semiconductor chip according to the first aspect of the present inventive concept; and a container having a bottom and a first opening, and the bottom and the first opening are opposite, wherein an accommodation space is between the bottom and the first opening, and part of the semiconductor chip where the microelectrode is disposed is provided at the bottom of the container.

According to an embodiment of the present inventive concept, the bottom has a second opening, and the packaging structure further comprises a base board, wherein the semiconductor chip is provided on the base board, and at least part of the semiconductor chip where the microelectrode is disposed is interconnected to the first opening through the second opening.

According to an embodiment of the present inventive concept, the bottom of the container is made of insulating material.

In a third aspect, the present inventive concept provides a control system of the programmable dielectrophoretic semiconductor chip. The control system comprises a programmable dielectrophoretic semiconductor chip according to the first aspect or the second aspect of the present inventive concept; a pattern processor used to generate the pattern signal; and a signal generator used to generate the first analog signal and the second analog signal and to deliver the first analog signal and the second analog signal to the semiconductor chip.

According to an embodiment of the present inventive concept, the control system further comprises a processor, wherein the processor is used to deliver the pattern signal to the first logic circuit of the microelectrode.

According to an embodiment of the present inventive concept, the semiconductor chip comprises a plurality of microelectrodes, wherein the plurality of microelectrodes are serial-connected to form a scan chain, and the semiconductor chip comprises a plurality of scan chains, wherein the processor is used to divide the pattern signal generated by the pattern processor and to deliver the divided pattern signal to each corresponding scan chain.

According to an embodiment of the present inventive concept, the control system further comprises an imaging device, wherein the imaging device is toward the surface of the microelectrode.

According to an embodiment of the present inventive concept, the microelectrode further comprises a sensing component, and the sensing component is used to sense an information for a particle on the surface corresponding to the microelectrode, wherein the pattern processor is further used to receive the information for the particle sensed by the sensing component and to generate the pattern signal according to the information for the particle.

According to an embodiment of the present inventive concept, the control system further comprises a container, wherein the container has a bottom and a first opening, and the bottom and the first opening are opposite, wherein an accommodation space is between the bottom and the first opening, and part of the semiconductor chip where the microelectrode is disposed is provided at the bottom of the container.

According to an embodiment of the present inventive concept, the control system further comprises a base board, and the bottom of the container has a second opening, wherein the semiconductor chip is provided on the base board, and at least part of the semiconductor chip where the microelectrode is disposed is interconnected to the first opening through the second opening.

Compared to the prior art, the present inventive concept provides the programmable dielectrophoretic semiconductor chip and the control system thereof capable to generate complex and programmable electric field patterns for moving or positioning a specific single particle. Besides, the packaging structure with the programmable dielectrophoretic semiconductor chip of the present inventive concept is designed to be compatible with petri dish. The present inventive concept allows to integrate the semiconductor chip with existing cell culture processes for biological sample. During culture, the biological sample is selected or separated by the semiconductor chip of the present inventive concept.

DETAILED DESCRIPTION

The present inventive concept is described by the following specific embodiments. Those with ordinary skills in the arts can readily understand other advantages and functions of the present inventive concept after reading the disclosure of this specification. Any changes or adjustments made to their relative relationships, without modifying the substantial technical contents, are also to be construed as within the range implementable by the present inventive concept.

Moreover, the word "exemplary" or "embodiment" is used herein to mean serving as an example, instance, or illustration. Any aspect or design described herein as exemplary or an embodiment is not necessarily to be construed as preferred or advantageous over other aspects or designs. Rather, use of the word "exemplary" or "embodiment" is intended to present concepts and techniques in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Figure 1:
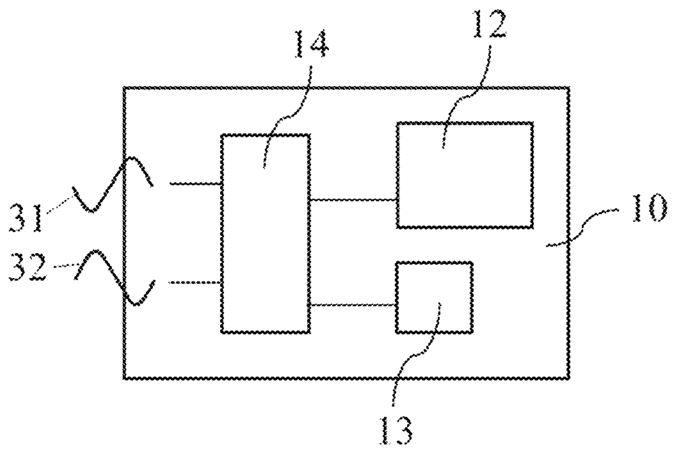
FIG. 1 is a schematic diagram of the microelectrode according to a first embodiment of the present inventive concept.
Figure 2:
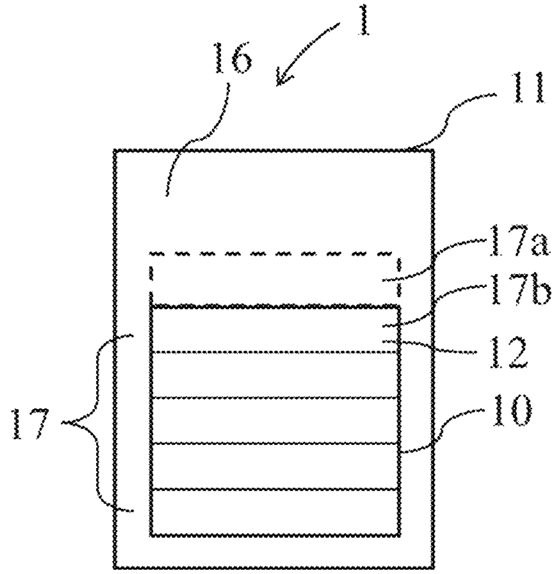
FIG. 2 is a schematic section view of the first embodiment of the present inventive concept.

Please refer to FIG. 1 and FIG. 2 together. FIG. 1 is a schematic diagram of the microelectrode according to a first embodiment of the present inventive concept, and FIG. 2 is a schematic section view of the first embodiment of the present inventive concept. In a first aspect, the present inventive concept provides a the programmable dielectrophoretic semiconductor chip 1. The semiconductor chip 1 may comprises a microelectrode 10. In an embodiment of the present inventive concept, the microelectrode 10 may comprises a surface 11, a top electrode 12, a first logic circuit 13 and a second logic circuit 14. The first logic circuit 13 may be used to receive and store a pattern signal. The second logic circuit 14 may be connected electrically to the top electrode 12 and the first logic circuit 13, and the second logic circuit 14 is used to receive a first analog signal 31 and a second analog signal 32 which are input from an external part of the microelectrode 10, wherein the second logic circuit 14 may be used to choose the first analog signal 31 or the second analog signal 32 according to the pattern signal which is received by the first logic circuit 13, and a voltage of the top electrode 12 changes with the first analog signal 31 or the second analog signal 32. In this embodiment, the top electrode 12 may be provided close to the surface 11. When the voltage of the top electrode 12 changes with the first analog signal 31 or the second analog signal 32, a corresponding electric field would be formed on the surface 11. Preferably, in this embodiment, the first logic circuit 13 may be a D-flip-flop (DFF), and the second logic circuit 14 may be a transmission gate-based analog multiplexer (TGMUX), but not limited thereto.

In an embodiment of the present inventive concept, the length and width of the microelectrode 10 may be approximately 1 to 40 micrometers (μm) depending on the number of functional circuits contained in the microelectrode 10. Preferably, the length and width of the microelectrode 10 may be approximately 10 micrometers.

In an embodiment of the present inventive concept, the length and width of the semiconductor chip 1 may be adjusted according to actual application requirements. For instance, the length and width of the semiconductor chip 1 may be approximately 0.1 to 100 millimeters. Preferably, the length and width of the semiconductor chip 1 may be approximately 1 to 10 millimeters.

Figure 3:
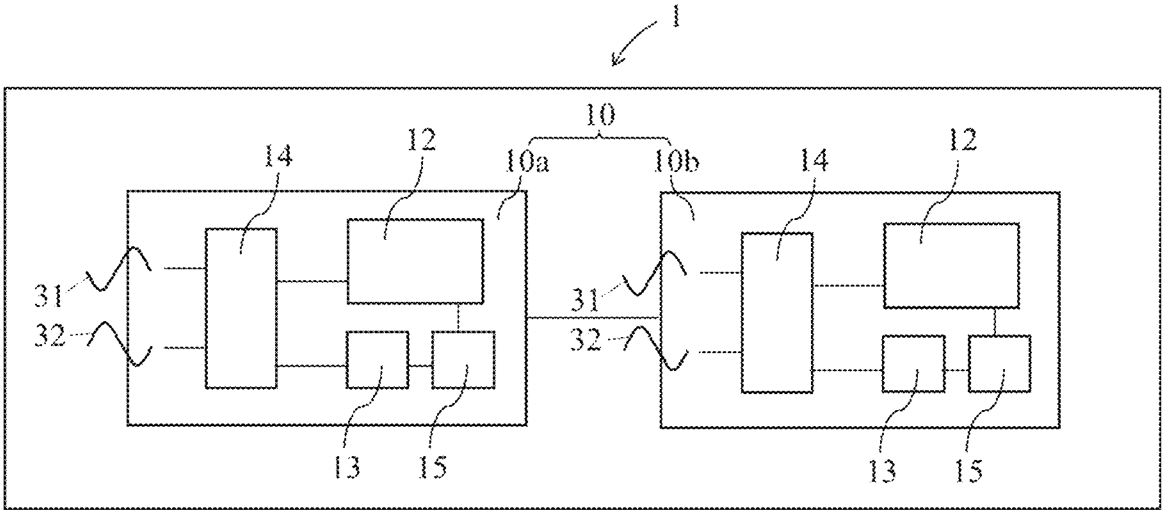
FIG. 3 is a schematic diagram of the semiconductor chip according to a second embodiment of the present inventive concept.
Figure 4:
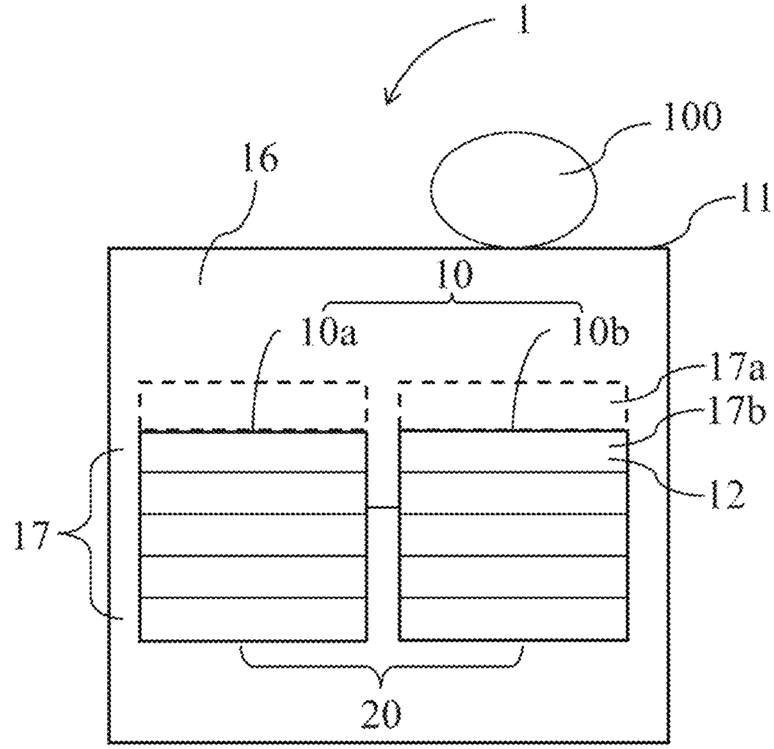
FIG. 4 is a schematic section view of the second embodiment of the present inventive concept.

Please refer to FIG. 3 and FIG. 4 together. FIG. 3 is a schematic diagram of the semiconductor chip according to a second embodiment of the present inventive concept, and FIG. 4 is a schematic section view of the second embodiment of the present inventive concept. In an embodiment of the present inventive concept, as the microelectrode 10*a* and 10*b* shown in FIG. 3, the microelectrode 10 may further comprise a sensing component 15. The sensing component 15 may be connected electrically to the top electrode 12 and the first logic circuit 13. Moreover, as shown in FIG. 4, the sensing component 15 is used to sense an information for a particle on the surface 11 corresponding to the microelectrode 10*a* and 10*b*. The information for the particle may comprise the size of the particle 100, the structure of the particle 100 or the composition of the particle 100, but not limited thereto.

In an embodiment of the present inventive concept, the particle 100 may comprise biotic particle, such as cell, virus, bacterium, DNA, RNA or protein, but not limited thereto. In another embodiment of the present inventive concept, the particle 100 may also comprise abiotic particle, such as small molecule compound or any such substance which would be identified or quantified, but not limited thereto.

In an embodiment of the present inventive concept, the microelectrode 10 may further comprise an insulating layer 16. The insulating layer 16 is provided between the top electrode 12 and the surface 11. Preferably, in another embodiment of the present inventive concept, there may be no insulating layer 16 between part of the top electrode 12 and corresponding part of the surface 11, which means that part of the insulating layer 16 is provided between the top electrode 12 and the surface 11. When the voltage is produced by the top electrode 12, the electric field is preferred formed on the surface 11. Therefore, the particle 100 on the semiconductor chip 1 of the present inventive concept is easier to be moved or trapped for positioning.

Please refer to FIG. 2 and FIG. 4. In an embodiment of the present inventive concept, the microelectrode 10 may have a plurality of metal layers 17. Preferably, the microelectrode 10 may have five metal layers 17. In this embodiment, the manufacturing method of the five metal layers 17 may comprise, for example, using a CMOS process to form the five metal layers 17, or using the CMOS process to form six metal layers and then removing one metal layer which is the closest to the surface 11, the highest metal layer 17*a*, to form the five metal layers 17, or using the CMOS process to form six metal layers and to form the insulating layer on the sixth metal layer, and then removing the sixth metal layer and the insulating layer to form the five metal layers 17, but not limited thereto. Besides, the number of the metal layers of the microelectrode 10 is also not limited to five layers. The number of the metal layers or the thickness of the metal layers may be adjusted by the manufacturing method or the requirements of final products.

In an embodiment of the present inventive concept, the top electrode 12 is the one with the shortest distance from the surface 11 among the plurality of metal layers 17. Preferably, in the embodiment of the microelectrode with the five metal layers, the top electrode 12 may be the one with the shortest distance from the surface 11 among the five metal layers 17.

In an embodiment of the present inventive concept, the top electrode 12 may be the second highest metal layer 17*b* among the plurality of metal layers which are manufactured by the manufacturing method. Specifically, in the prior art, when several metal layers are produced by the manufacturing method, the highest metal layer 17*a*, which is the one with the shortest distance from the surface of the semiconductor chip among all the produced metal layers would be chosen to be the top electrode and the passivation layer on the highest metal layer 17*a* would be chosen to be the insulating layer. According to the present inventive concept, the second highest metal layer 17*b* of the microelectrode 10 rather than the highest metal layer 17*a* would be chosen to be the top electrode, wherein the second highest metal layer 17*b* is the one with the shortest distance from the highest metal layer 17*a*. Therefore, the second highest metal layer 17*b* would be the one with the shortest distance from the surface 11 among the plurality of metal layers 17, and the insulating layer 16 is provided between the surface 11 and the second highest metal layer 17*b*. By chosen the second highest metal layer 17*b* to be the top electrode 12, the surface 11 may be more flattening. Further, the distance between the top electrode 12 and the surface 11 is also significantly reduced so that the thickness of the insulating layer 16 become thinner. Moreover, the distance between the microelectrode 10*a* and the microelectrode 10*b* is effectively reduced so that the electric field formed on the surface 11 becomes stronger and the particle 100 on the semiconductor chip is easier to be moved or trapped for positioning. Specifically, compared to the structural design by choosing the highest metal layer 17*a* to be the top electrode, choosing the second highest metal layer 17*b* to be the top electrode may reduce the distance between the top electrode 12 and the surface 11 about four times, and reduce the distance between each electrode 10 about five times. As mentioned above, the number of the metal layers 17 of the microelectrode 10 is also not limited to five layers. The number of the metal layers or the thickness of the metal layers may be adjusted by the manufacturing method or the requirements of final products.

Figure 5:
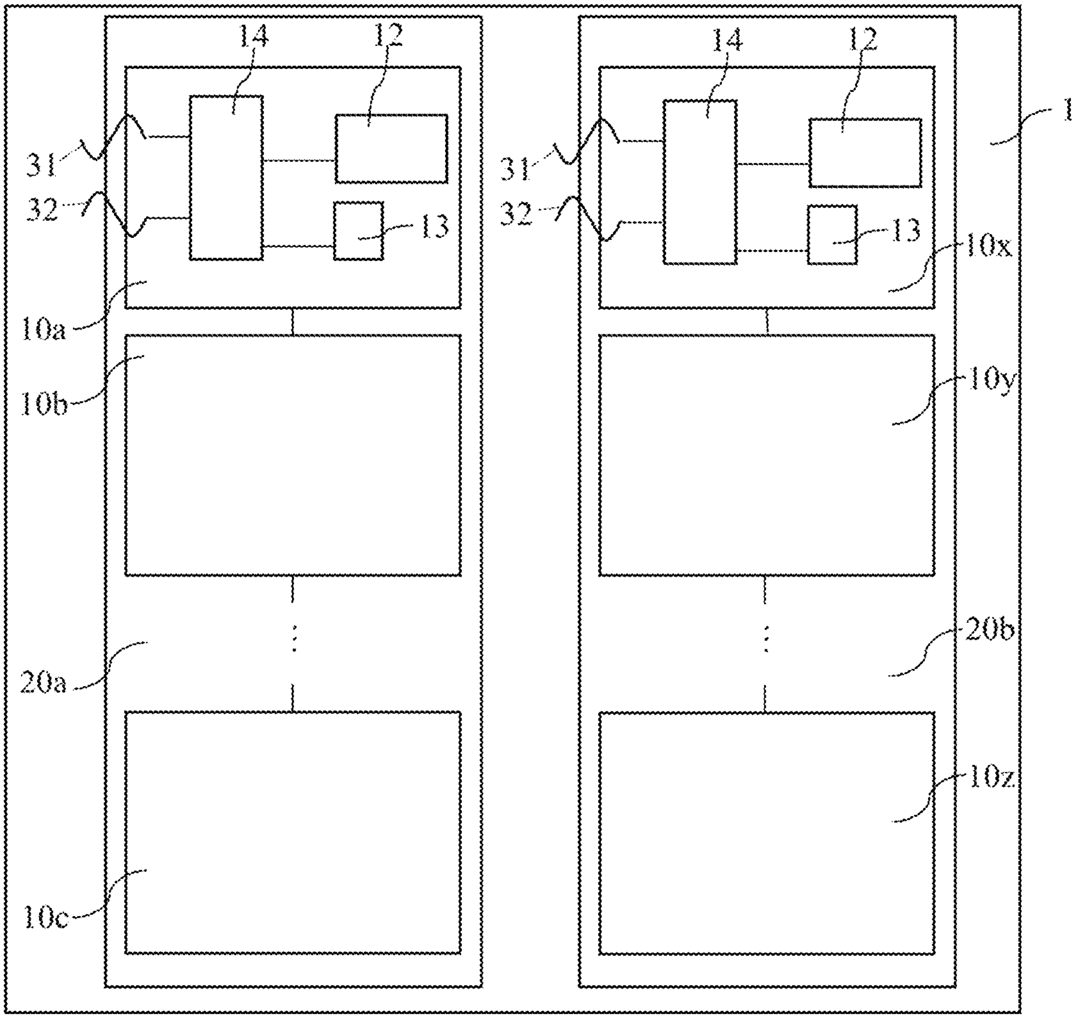
FIG. 5 is a schematic diagram according to a third embodiment of the present inventive concept.

Please refer to FIG. 4 and FIG. 5 together. FIG. 5 is a schematic diagram according to a third embodiment of the present inventive concept. In an embodiment of the present inventive concept, as shown in FIG. 4, the semiconductor chip 1 comprises a plurality of microelectrodes 10*a*~10*b*, wherein the plurality of microelectrodes 10*a*~10*b* are serial-connected to form a scan chain 20. In another embodiment of the present inventive concept, as shown in FIG. 5, the plurality of microelectrodes 10*a*~10*c* contained in the semiconductor chip 1 are serial-connected to form a scan chain 20*a*, and the plurality of microelectrodes 10*x*~10*z* contained in the semiconductor chip 1 are serial-connected to form a scan chain 20*b*.

Figure 6:
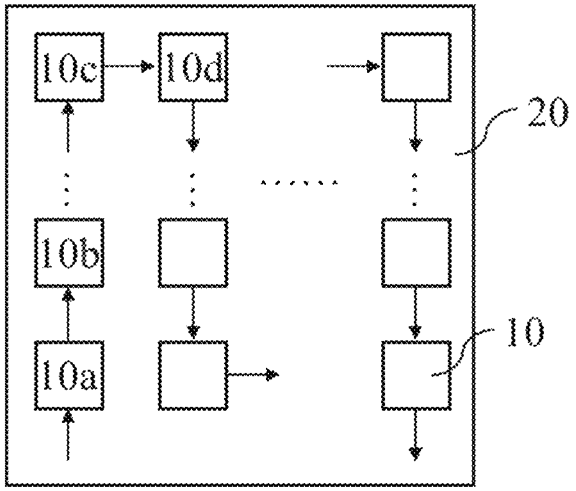
FIG. 6 is a schematic diagram of the scan chain according to one embodiment of the present inventive concept.

Please refer to FIG. 5 and FIG. 6. FIG. 6 is a schematic diagram of the scan chain according to one embodiment of the present inventive concept. In an embodiment of the present inventive concept, the semiconductor chip 1 may comprise a plurality of scan chains 20, wherein each scan chain 20 comprises the plurality of microelectrodes 10.

In an embodiment of the present inventive concept, as shown in FIG. 5, the semiconductor chip 1 may comprise two scan chains 20*a* and 20*b*, wherein the scan chain 20*a* comprises the microelectrodes 10*a*~10*c*, and the scan chain 20*b* comprises the microelectrodes 10*x*~10*z*, wherein the number of the microelectrodes contained in the scan chain 20*a* may be the same as the number of the microelectrodes contained in the scan chain 20*b*. In another embodiment of the present inventive concept, each scan chain 20 may comprise different number of microelectrodes 10. The number of the microelectrodes 10 contained in the scan chain 20 may be adjusted according to actual application requirements.

In an embodiment of the present inventive concept, the number of the microelectrodes 10 contained in the semiconductor chip 1 may be approximately 10 to 100000000, but not limited thereto. For example, the number of the microelectrodes 10 contained in the semiconductor chip 1 may be 128×128, and the semiconductor chip 1 may be divided into eight scan chains 20, wherein the number of the microelectrodes 10 contained in each scan chain 20 is 16×128. Alternatively, the number of the microelectrodes 10 contained in the semiconductor chip 1 may be 256×256, and the semiconductor chip 1 may be divided into four scan chains 20, wherein the number of the microelectrodes 10 contained in each scan chain 20 is 64×256, but not limited thereto.

In an embodiment of the present inventive concept, in the embodiment of the semiconductor chip 1 comprising the plurality of microelectrodes 10, the first logic circuit 13 of one of the microelectrodes 10 is used to receive and store the pattern signal which is output from the first logic circuit 13 of another microelectrode 10 connected in series to the microelectrode 10. Specifically, as shown in FIG. 6, the first logic circuit 13 of the microelectrode 10*b* is used to receive and store the pattern signal which is output from the first logic circuit 13 of the microelectrode 10*a* connected in series to the microelectrode 10*b*. The second logic circuit 14 of the microelectrode 10*b* is used to choose the first analog signal 31 or the second analog signal 32 according to the pattern signal which is received by the first logic circuit 13 of the microelectrode 10*b*, and the voltage of the top electrode 12 of the microelectrode 10*b* changes with the first analog signal 31 or the second analog signal 32. In this embodiment, the first logic circuit 13 of the microelectrode 10 may have two input signals and one output signal. For example, the first input signal of the first logic circuit 13 of the microelectrode 10*a* is the pattern signal to be stored, and the second input signal is used to determine whether the stored pattern signal is changed. If it is changed, the changed pattern signal is delivered to the first input signal of the first logic circuit 13 of the microelectrode 10*b* through the output signal of the microelectrode 10*a*. If it is not changed, the first input signal of the microelectrode 10*b* or microelectrode 10*c* would not be changed by the output signal of the microelectrode 10*a*. The practical operation principle between the microelectrode 10*c* and microelectrode 10*d* may be deduced in the same way.

In an embodiment of the present inventive concept, the first analog signal 31 and the second analog signal 32 may be set in advance according to the characteristic of the particle 100 so that a dielectrophoresis force capable to move or position the particle 100 would be generated on the surface 11.

Please refer to FIG. 4 and FIG. 5 again. In an embodiment of the present inventive concept, a signal of the top electrode 12 which follows the first analog signal 31 chose by the second logic circuit 14 may be different from a signal of the top electrode 12 which follows the second analog signal 32 chose by the second logic circuit 14. In this embodiment, when the following signal of the top electrode 12 is different, the electric field generated on the corresponding surface 11 may be different. Specifically, when the second logic circuit 14 of the microelectrode 10*b* chooses the first analog signal 31 and the second logic circuit 14 of the microelectrode 10*a* chooses the second analog signal 32, the electric field generated on the surface 11 of the microelectrode 10*b* is different from the electric field generated on the surface 11 of the microelectrode 10*a*. Therefore, the particle 100 moves from the surface 11 of the microelectrode 10*a* to the surface 11 of the microelectrode 10*b*, or the particle 100 moves from the surface 11 of the microelectrode 10*b* to the surface 11 of the microelectrode 10*a*.

In an embodiment of the present inventive concept, the dielectrophoresis force generated on the surface 11 of the microelectrode 10 may be a lateral positive DEP force to trap the particle 100 on the semiconductor chip 1. In another embodiment of the present inventive concept, the dielectrophoresis force generated on the surface 11 of the microelectrode 10 may be a lateral negative DEP force to push the particle 100 away from the surface 11 of the semiconductor chip 1 to reduce the possibility of the particle 100 sticking to the surface 11.

According to the present inventive concept, a non-uniform electric field is generated on the surface 11 of the semiconductor chip 1 by the top electrodes 12 following different preset signals to move or position the particle 100. In addition, programmable electric field patterns may be generated by the semiconductor chip 1 of the present inventive concept, and the specific particle 100 may be moved to a particular position through the first analog signal 31 and the second analog signal 32 received by the microelectrodes 10.

Figure 7:
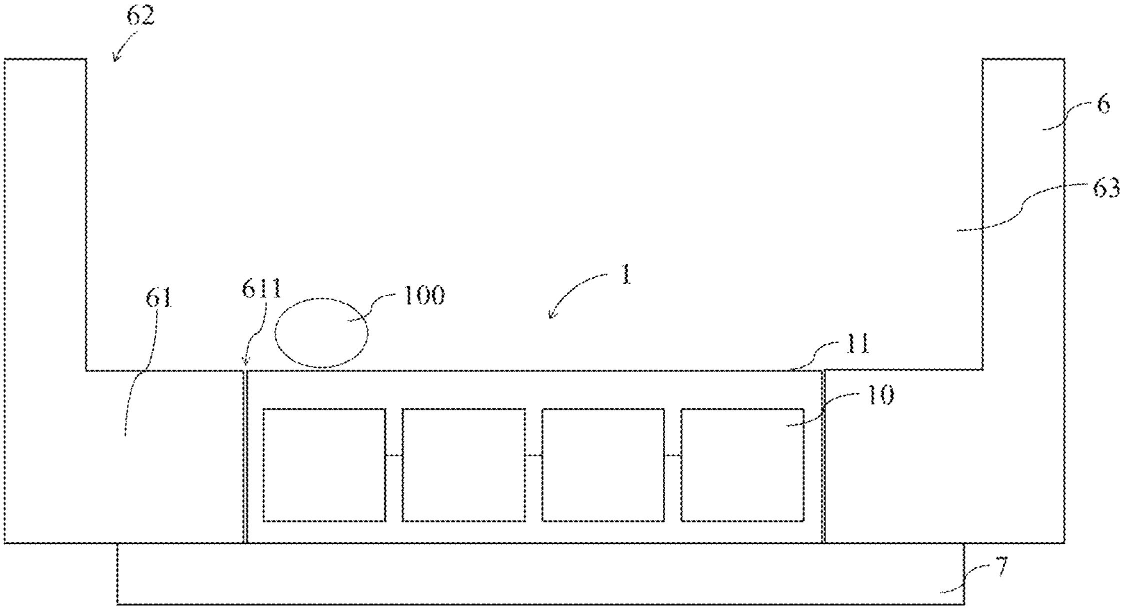
FIG. 7 is a schematic diagram of a structure of the packaging structure with the programmable dielectrophoretic semiconductor chip according to one embodiment of the present inventive concept.

Please refer to FIG. 7. FIG. 7 is a schematic diagram of a structure of the packaging structure with the programmable dielectrophoretic semiconductor chip according to one embodiment of the present inventive concept. In a second aspect, the present inventive concept provides a packaging structure with the programmable dielectrophoretic semiconductor chip. The packaging structure comprises a programmable dielectrophoretic semiconductor chip 1 according to the first aspect of the present inventive concept and a container 6. The container 6 may have a bottom 61 and a first opening 62, and the bottom 61 and the first opening 62 are opposite, wherein an accommodation space 63 may be between the bottom 61 and the first opening 62, and the semiconductor chip 1 is provided at the bottom 61.

In an embodiment of the present inventive concept, the accommodation space 63 of the container 6 may be used to culture biological samples. The container 6 may be, but not limited to, for example various cell culture dishes or utensils capable to accommodate biotic particles. In this embodiment, the semiconductor chip 1 of the packaging structure disposed at the bottom 61 of the container 6 would not affect the culture status and developmental process of the biological samples. During culture, the particle 100 may be moved or positioned at a desired position by the semiconductor chip 1 of the present inventive concept, which facilitates the growth or selection of the biological samples through the existing cell culture processes or culture methods of the biological samples.

In an embodiment of the present inventive concept, the bottom 61 has a second opening 611, and the semiconductor chip 1 may be provided at the second opening 611. Preferably, as shown in FIG. 0.7, the packaging structure may further comprise a base board 7, wherein the semiconductor chip 1 may be provided on the base board 7, and the base board 7 is connected to the bottom 61 of the container 6. Therefore, at least part of the semiconductor chip 1 where the microelectrode 10 is disposed is interconnected to the first opening 62 through the second opening 611, and the surface 11 of the semiconductor chip 1 provided at the second opening 611 is exposed.

In an embodiment of the present inventive concept, the bottom 61 of the container 6 may be made of insulating material. Preferably, the bottom 61 of the container 6 and the base board 7 may be made of insulating material. In another embodiment of the present inventive concept, the container 6 and the base board 7 may also be made of other materials which may be adjusted according to actual application requirements.

In an preferred embodiment of the present inventive concept, the dielectrophoresis force generated by the semiconductor chip 1 may be the lateral negative DEP force so that the packaging structure is unnecessary to provide a top plate disposed on the semiconductor chip 1 additionally to avoid the particle 10 sticking to the surface 11

Figure 8:
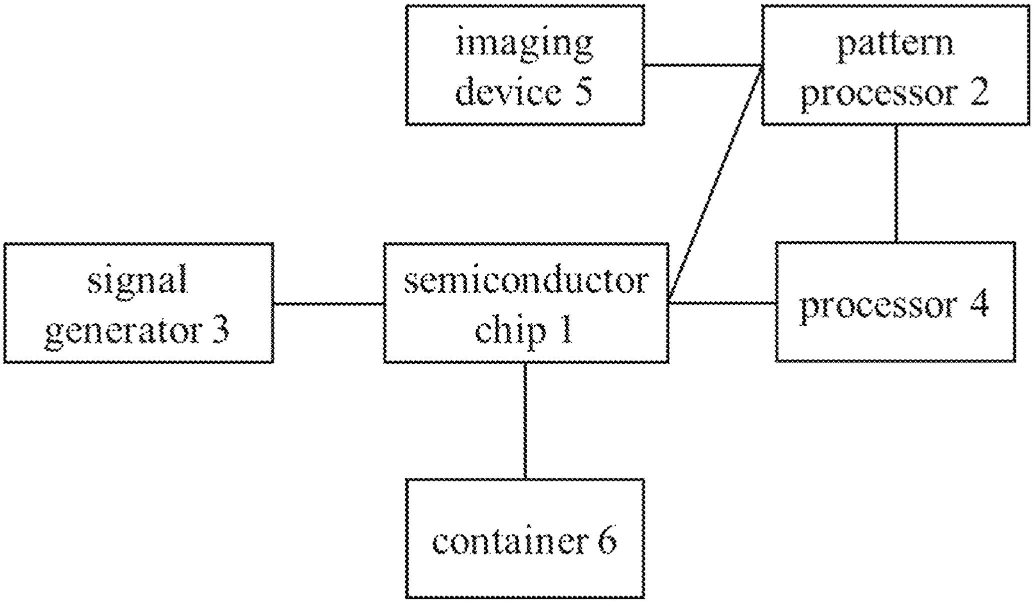
FIG. 8 is a component organization of the control system of the programmable dielectrophoretic semiconductor chip according to one embodiment of the present inventive concept.

Please refer to FIG. 1 to FIG. 5, FIG. 7 and FIG. 8 together. FIG. 8 is a component organization of the control system of the programmable dielectrophoretic semiconductor chip according to one embodiment of the present inventive concept. In a third aspect, the present inventive concept provides a control system of the programmable dielectrophoretic semiconductor chip. The control system comprises a programmable dielectrophoretic semiconductor chip 1 according to the first aspect of the present inventive concept, a pattern processor 2 and a signal generator 3. The pattern processor 2 may be used to generate the pattern signal. The signal generator 3 may be used to generate the first analog signal 31 and the second analog signal 32 and to deliver the first analog signal 31 and the second analog signal 32 to the semiconductor chip 1.

In an embodiment of the present inventive concept, the control system may further comprise a container 6. The components and structures of the container 6 is described in the above embodiments and would not be repeated again here.

In an embodiment of the present inventive concept, the control system may further comprise a processor 4, wherein the processor 4 is used to deliver the pattern signal generated by the pattern processor 2 to the first logic circuit 13 of the microelectrode 1.

In an embodiment of the present inventive concept, in the embodiment of the semiconductor chip 1 comprising the plurality of microelectrodes 10 which are serial-connected to form the scan chain 20, the processor 4 may be used to divide the pattern signal generated by the pattern processor 2 and to deliver the divided pattern signal to each corresponding scan chain 20. Specifically, as shown in FIG. 5, the semiconductor chip 1 may comprise two scan chains 20*a* and 20*b*. The processor 4 is used to divide the pattern signal generated by the pattern processor 2 and to deliver the divided pattern signal to the corresponding scan chains 20*a* and 20*b* respectively. Therefore, the first logic circuit 13 of the microelectrodes 10*a*~10*c* in the scan chain 20*a* may receive and store the pattern signal corresponding to the microelectrodes 10*a*~10*c*, and the first logic circuit 13 of the microelectrodes 10*x*-10*z* in the scan chain 20*b* may receive and store the pattern signal corresponding to the microelectrodes 10*x*~10*z*. In this embodiment, when the semiconductor chip 1 have multiple microelectrodes 10, the pattern signal is divided by the processor 4 and delivered to each corresponding scan chain, which would effectively increase the transmission efficiency and avoid data transfer errors caused by transmission latency.

In an embodiment of the present inventive concept, the control system may further comprise an imaging device. In this embodiment, the imaging device 5 may be toward the surface 11 of the microelectrode 10. In this embodiment, the imaging device 5 may monitor the information for the particle 100 and then the specific pattern signal is generated by the pattern processor 2 so that the particle 100 may be moved to a particular position or be positioned at a particular position.

In another embodiment of the present inventive concept, in the embodiment of the microelectrode 10 comprising the sensing component 15 used to sense the information for the particle on the surface 11 corresponding to the microelectrode 10, the pattern processor 2 may be further used to receive the information for the particle sensed by the sensing component 15 and to generate the pattern signal according to the information for the particle. Specifically, as shown in FIG. 3 and FIG. 4, the information for the particle 100 on the surface 11 is sensed by the sensing component 15 of the microelectrode 10*b*, and the information for the particle may be obtained directly by the pattern processor 2 and then the pattern processor 2 generates the specific pattern signal according to the information for the particle so that the particle 100 is moved to a particular position or is positioned at a particular position. In this embodiment, by sensing the corresponding surface 11 with the sensing component 15, the pattern processor 2 may directly obtain the information for the particle and generate the pattern signal so that the control system may be unnecessary to provide the imaging device 5. Therefore, the control system is simplified to increase the operational convenience, to reduce the cost, and to be carried and moved easily.

Compared to the prior art, the present inventive concept provides the programmable dielectrophoretic semiconductor chip and the control system thereof capable to generate complex and programmable electric field patterns for moving or positioning a specific single particle. Besides, the packaging structure with the programmable dielectrophoretic semiconductor chip of the present inventive concept is designed to be compatible with petri dish. The present inventive concept allows to integrate the semiconductor chip with existing cell culture processes for biological sample. During culture, the biological sample is selected or separated by the semiconductor chip of the present inventive concept.

The foregoing descriptions of the detailed embodiments are only illustrated to disclose the features and functions of the present inventive concept and not restrictive of the scope of the present inventive concept. It should be understood to those in the art that all modifications and variations according to the spirit and principle in the disclosure of the present inventive concept should fall within the scope of the appended claims.

What is claimed is:

1. A programmable dielectrophoretic semiconductor chip, which comprises:

a plurality of microelectrodes, wherein each of the plurality of microelectrodes comprises:

a surface;

a top electrode provided close to the surface;

a first logic circuit used to receive and store a pattern signal; and a second logic circuit electrically connected to the top electrode and the first logic circuit, and the second logic circuit is used to receive a first analog signal and a second analog signal which are input from an external source, wherein the second logic circuit is used to choose whether the first analog signal or the second analog signal according to the pattern signal which is received by the first logic circuit, which enable a voltage of the top electrode to change along with the first analog signal or the second analog signal, wherein each of the plurality of microelectrodes is serial-connected to each other to form a scan chain, wherein the programmable dielectrophoretic semiconductor chip comprises a plurality of scan chains, wherein each of the scan chains comprises the plurality of microelectrodes.

2. The programmable dielectrophoretic semiconductor chip of claim 1, wherein the microelectrode further comprises a sensing component, wherein the sensing component is used to sense information of a particle on the surface corresponding to the microelectrode.

3. The programmable dielectrophoretic semiconductor chip of claim 1, wherein the microelectrode further comprises an insulating layer, wherein the insulating layer is provided between the top electrode and the surface.

4. The programmable dielectrophoretic semiconductor chip of claim 1, wherein the microelectrode further comprises an insulating layer, wherein part of the insulating layer is provided between the top electrode and the surface.

5. The programmable dielectrophoretic semiconductor chip of claim 1, wherein each of the microelectrodes has a plurality of metal layers.

6. The programmable dielectrophoretic semiconductor chip of claim 5, wherein the top electrode is one of the plurality of metal layers and is the one with the shortest distance from the surface among the plurality of metal layers.

7. The programmable dielectrophoretic semiconductor chip of claim 5, wherein the top electrode is the second highest metal layer among the plurality of metal layers.

8. The programmable dielectrophoretic semiconductor chip of claim 1, wherein the first logic circuit of one of the plurality of microelectrodes is used to receive and store the pattern signal which is output from the first logic circuit of another microelectrode connected in series to the microelectrode.

9. The programmable dielectrophoretic semiconductor chip of claim 1, wherein the first analog signal is different from the second analog signal.

10. A packaging structure with the programmable dielectrophoretic semiconductor chip, which comprises:

a programmable dielectrophoretic semiconductor chip of claim 1; and a container having a bottom and a first opening opposite to the bottom, wherein an accommodation space is provided between the bottom and the first opening, and a part of the programmable dielectrophoretic semiconductor chip where the microelectrode is disposed is provided at the bottom of the container.

11. The packaging structure with the programmable dielectrophoretic semiconductor chip of claim 10, wherein the bottom has a second opening, and the packaging structure further comprises a base board, wherein the programmable dielectrophoretic semiconductor chip is provided on the base board, and at least part of the programmable dielectrophoretic semiconductor chip where the microelectrode is disposed is interconnected with the first opening through the second opening.

12. The packaging structure with the programmable dielectrophoretic semiconductor chip of claim 11, wherein the bottom of the container is made of an insulating material.

13. A control system of the programmable dielectrophoretic semiconductor chip, which comprises:

a programmable dielectrophoretic semiconductor chip of claim 1;

a pattern processor used to generate the pattern signal; and a signal generator used to generate the first analog signal and the second analog signal and to transmit the first analog signal and the second analog signal to the programmable dielectrophoretic semiconductor chip.

14. The control system of the programmable dielectrophoretic semiconductor chip of claim 13, the control system further comprises a processor, wherein the processor is used to transmit the pattern signal to the first logic circuit of the microelectrode.

15. The control system of the programmable dielectrophoretic semiconductor chip of claim 14, wherein the programmable dielectrophoretic semiconductor chip comprises a plurality of microelectrodes, wherein each of the plurality of microelectrodes are serial-connected to each other to form a scan chain, and the programmable dielectrophoretic semiconductor chip comprises a plurality of scan chains, wherein the processor is used to decompose the pattern signal generated by the pattern processor and to transmit the decomposed pattern signal to each of the scan chain correspondingly.

16. The control system of the programmable dielectrophoretic semiconductor chip of claim 13, wherein the control system further comprises an imaging device, wherein the imaging device captures an image of the surface of the microelectrode.

17. The control system of the programmable dielectrophoretic semiconductor chip of claim 13, wherein the microelectrode further comprises a sensing component, and the sensing component is used to sense information of a particle on the surface corresponding to the microelectrode, wherein the pattern processor is further used to receive the information of the particle sensed by the sensing component and to generate the pattern signal according to the information of the particle.

18. The control system of the programmable dielectrophoretic semiconductor chip of claim 13, wherein the control system further comprises a container, wherein the container has a bottom and a first opening opposite to the bottom, wherein an accommodation space is provided between the bottom and the first opening, and a part of the programmable dielectrophoretic semiconductor chip where the microelectrode is disposed is provided at the bottom of the container.

19. The control system of the programmable dielectrophoretic semiconductor chip of claim 18, wherein the control system further comprises a base board, and the bottom of the container has a second opening, wherein the programmable dielectrophoretic semiconductor chip is provided on the base board, and at least part of the semiconductor chip where the microelectrode is disposed is interconnected with the first opening through the second opening.

* * * * *